United States Patent
Goldstein et al.

(10) Patent No.: US 6,706,313 B1
(45) Date of Patent: *Mar. 16, 2004

(54) AQUEOUS COATING COMPOSITION AND METHOD

(75) Inventors: Albert Goldstein, Tinton Falls, NJ (US); Godfrey Gomes, Morganville, NJ (US)

(73) Assignee: LRC Products Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/806,208

(22) PCT Filed: Sep. 14, 1999

(86) PCT No.: PCT/US99/21353

§ 371 (c)(1),
(2), (4) Date: Jul. 13, 2001

(87) PCT Pub. No.: WO00/15353

PCT Pub. Date: Mar. 23, 2000

Related U.S. Application Data

(63) Continuation-in-part of application No. 09/152,863, filed on Sep. 14, 1998, now Pat. No. 6,242,042.

(51) Int. Cl.$^7$ .................................. B05D 3/02
(52) U.S. Cl. ................... 427/2.3; 427/393.5; 427/430.1
(58) Field of Search ........................... 427/385.5, 393.5, 427/2.3, 430.1

(56) References Cited

U.S. PATENT DOCUMENTS

| | | |
|---|---|---|
| 2,324,735 A | 7/1943 | Spanel |
| 2,400,720 A | 5/1946 | Staudinger et al. |
| 2,621,333 A | 12/1952 | Thomas et al. |
| 2,974,373 A | 3/1961 | Streed et al. |
| 2,976,576 A | 3/1961 | Wichterlel et al. |
| 2,989,755 A | 6/1961 | O'Brien et al. |
| 3,142,581 A | 7/1964 | Leland |
| 3,411,982 A | 11/1968 | Kavalir et al. |
| 3,419,562 A | 12/1968 | Wakeman et al. |
| 3,445,264 A | 5/1969 | Haines |
| 3,503,942 A | 3/1970 | Seiderman |

(List continued on next page.)

FOREIGN PATENT DOCUMENTS

| | | |
|---|---|---|
| DE | 25 02 047 | 7/1976 |
| EP | 0 190 647 | 8/1986 |
| EP | 0 688 576 | 12/1995 |
| FR | 1434453 | 3/1965 |
| FR | 1453817 | 8/1966 |
| FR | 2193710 | 7/1972 |
| FR | 2293486 | 12/1975 |
| FR | 2297910 | 1/1976 |
| GB | 208084 | 7/1956 |
| GB | 859297 | 1/1961 |
| GB | 1028446 | 5/1966 |
| GB | 1200106 | 7/1970 |
| GB | 1268637 | 3/1972 |
| GB | 1496345 | 12/1977 |
| GB | 1532216 | 11/1978 |
| WO | 84/00908 | 3/1984 |
| WO | 84/02138 | * 6/1984 |

OTHER PUBLICATIONS

Nathan, P., et al., "A New Biomaterial for the Control of Infection in the Burn Wound", XXII, *Trans. Amer. Soc. Artif. Int. Organs*, 1976.

*Primary Examiner*—Erma Cameron
(74) *Attorney, Agent, or Firm*—Darby & Darby

(57) ABSTRACT

A water soluble hydrophilic resin in an alcohol-free polymer solution and a method of application to natural rubber and synthetic latex products such as surgeon's gloves, catheters and condoms to increase the lubricity of the rubber products where they come into contact with skin or other tissue. The hydrophilic resin is applied in a single application step in an aqueous solution in the absence of alcohol or a separate acid priming step.

12 Claims, 1 Drawing Sheet

U.S. PATENT DOCUMENTS

| | | |
|---|---|---|
| 3,515,579 A | 6/1970 | Shepherd et al. |
| 3,520,949 A | 7/1970 | Shepherd et al. |
| 3,541,192 A | 11/1970 | Shapero et al. |
| 3,566,874 A | 3/1971 | Shepherd et al. |
| 3,574,822 A | 4/1971 | Shepherd et al. |
| 3,577,516 A | 5/1971 | Gould et al. |
| 3,598,127 A | 8/1971 | Wepsic |
| 3,621,079 A | 11/1971 | Leeds |
| 3,626,517 A | 12/1971 | Kurtz |
| 3,632,514 A | 1/1972 | Blocher |
| 3,669,103 A | 6/1972 | Harper |
| 3,669,786 A | 6/1972 | Moore |
| 3,684,633 A | 8/1972 | Haase |
| 3,695,921 A | 10/1972 | Sheperd et al. |
| 3,728,739 A | 4/1973 | Semp |
| 3,745,042 A | 7/1973 | Lim et al. |
| 3,762,978 A | 10/1973 | Holmes et al. |
| 3,784,540 A | 1/1974 | Kliment et al. |
| 3,813,695 A | 6/1974 | Podell, Jr. et al. |
| 3,849,185 A | 11/1974 | Shepherd et al. |
| 3,852,826 A | 12/1974 | Schindler |
| 3,856,561 A | 12/1974 | Esemplare et al. |
| 3,869,303 A | 3/1975 | Orlov et al. |
| 3,872,515 A | 3/1975 | Miner et al. |
| 3,919,442 A | 11/1975 | Esemplare et al. |
| 3,933,407 A | 1/1976 | Tu |
| 3,935,342 A | 1/1976 | Lim |
| 3,959,554 A | 5/1976 | Hick |
| 4,024,317 A | 5/1977 | Stoye et al. |
| 4,039,714 A | 8/1977 | Roubal et al. |
| 4,045,399 A | 8/1977 | Suzuki et al. ............ 260/29.36 |
| 4,051,884 A | 10/1977 | Bourne et al. |
| 4,064,564 A | 12/1977 | Casey |
| 4,082,862 A | 4/1978 | Esemplare et al. |
| 4,086,852 A | 5/1978 | Hamermesh et al. |
| 4,100,309 A | 7/1978 | Micklus et al. |
| 4,143,109 A | 3/1979 | Stockum |
| 4,143,423 A | 3/1979 | Sternlieb |
| 4,144,363 A | 3/1979 | Balloni et al. |
| 4,170,582 A | 10/1979 | Mori et al. |
| 4,220,679 A | 9/1980 | Backhouse |
| 4,251,305 A | 2/1981 | Becker et al. |
| 4,302,852 A | 12/1981 | Joung |
| 4,304,008 A | 12/1981 | Joung |
| 4,310,928 A | 1/1982 | Joung |
| 4,312,797 A * | 1/1982 | Aihara et al. ................ 428/461 |
| 4,337,111 A | 6/1982 | Kauffman |
| 4,459,289 A | 7/1984 | Maltz |
| 4,482,577 A | 11/1984 | Goldstein et al. |
| 4,485,092 A | 11/1984 | Ashton et al. |
| 4,499,154 A | 2/1985 | James et al. |
| 4,526,828 A | 7/1985 | Fogt et al. |
| 4,548,844 A | 10/1985 | Podell et al. |
| 4,575,476 A * | 3/1986 | Podell et al. ................ 428/494 |
| 4,589,873 A | 5/1986 | Schwartz et al. |
| 4,597,108 A | 7/1986 | Momose |
| 4,638,043 A | 1/1987 | Szycher et al. |
| 4,747,845 A | 5/1988 | Korol |
| 4,771,482 A | 9/1988 | Shlenker |
| 4,846,164 A | 7/1989 | Martz |
| 4,853,978 A | 8/1989 | Stockum |
| 4,857,334 A | 8/1989 | Korol |
| 4,867,174 A | 9/1989 | Skribiski |
| 4,880,839 A | 11/1989 | Tucker |
| 4,883,828 A | 11/1989 | Oakes et al. |
| 4,909,244 A | 3/1990 | Quarfoot |
| 4,919,966 A | 4/1990 | Shlenker |
| 4,925,677 A | 5/1990 | Feijen |
| 4,932,948 A | 6/1990 | Kernes et al. |
| 4,944,920 A | 7/1990 | Rubinstein |
| 5,013,769 A | 5/1991 | Murray et al. |
| 5,039,459 A | 8/1991 | Kindt-Larsen et al. ....... 264/2.6 |
| 5,059,424 A | 10/1991 | Cartmell |
| 5,061,487 A | 10/1991 | Blank et al. |
| 5,064,652 A | 11/1991 | Bay .......................... 424/445 |
| 5,080,902 A | 1/1992 | Allenmark et al. |
| 5,124,181 A | 6/1992 | Schaffer et al. |
| 5,137,718 A | 8/1992 | Gillespie |
| 5,143,731 A | 9/1992 | Vieges et al. |
| 5,164,057 A | 11/1992 | Mori et al. |
| 5,300,059 A * | 4/1994 | Rubinstein et al. ......... 604/408 |
| 5,419,913 A | 5/1995 | Podell et al. |
| 5,612,083 A | 3/1997 | Huang et al. ............... 264/233 |
| 5,620,702 A | 4/1997 | Podell et al. |

\* cited by examiner

AQUEOUS COATING COMPOSITION AND METHOD

CROSS-REFERENCE TO RELATED APPLICATION

This application is the National Phase of International Application No. PCT/US99/21353, filed Sep. 14, 1999, which is a continuation-in-part of and claims benefit of U.S. Pat. application Ser. No. 09/152,863, filed Sep. 14, 1998, now U.S. Pat. No. 6,242,042, the entire disclosure of which is incorporated by reference herein.

BACKGROUND OF THE INVENTION

1. Field of the Invention

This invention relates to hydrogel polymer coatings for natural rubber and synthetic latex articles and to improved methods of applying such coatings. More specifically, the invention relates to a hydrophilic water soluble polymer in an alcohol-free solution and a method for applying this material to natural rubber latex and synthetic latex articles. The hydrogel coating of the invention makes it easier for the user to don the rubber or latex article bearing the coating.

2. Description of the Related Art

Hydrogel polymers or resins are coated on rubber and synthetic latex products, such as surgical gloves, condoms, catheters, and ureters to enhance the lubricity of the product when in contact with human skin or tissue, i.e., to facilitate donning the rubber or latex product to which the polymer has been applied. For example, in the case of uncoated latex surgical gloves, which have poor lubricity relative to skin, the gloves are difficult to don and require a lubricant to be applied to the inner surface of the glove to facilitate donning of the glove. Prior art lubricants have included powder materials, such as particulate epichlorhydrin-treated maize starch, applied conventionally to the inner surface of the glove to ease donning of the glove. However, powdered lubricants are undesirable in that there is a risk that the lubricant will escape from the interior of the glove and contaminate the surgical field. Also, starch powder has been implicated as a carrier of latex allergens that are responsible for latex allergies that affect health care workers and others.

As a further solution to the problem, polymeric lubricant coatings have been developed which are permanently bonded to the surface of the rubber or latex article. For example, U.S. Pat. No. 3,813,695 discloses a surgeon's glove formed of a flexible material, such as natural rubber or synthetic latex, with an inner (skin contacting) layer consisting of a polymerized hydrogel coating and a silicone liquid for increasing the lubricity of the interior of the glove.

U.S. Pat. Nos. 4,548,844, ('844 patent) also discloses a surgical glove with a coating of a hydrogel polymer on the inner surface of the glove. The polymerized lubricant coating of the '844 patent is hydrophilic, i.e., water absorbing, and is intended to increase the comfort of the surgical glove to the wearer. The hydrogel coating of the '844 patent is applied to the inner surface of the glove prior to heat vulcanization and curing of the polymer. One of the polymers disclosed in the '844 patent consists of 2-hydroxyethyl methacrylate (HEMA) and acrylic acid (AcAc) at a ratio of approximately 90% HEMA to 10% AcAc. The HEMA/AcAc polymer is applied to the surgical glove in an aqueous solution. The ability of a polymer to form a continuous film on a substrate after coating is important to forming a final polymer coating that is durable and of high quality. The HEMA as a copolymer with acrylic acid may achieve water solubility but the high concentration of acrylic acid affects the film properties in a deleterious manner forming a coating which is patchy and has poor consistency.

The '844 patent also discloses a terpolymer of HEMA, methacrylic acid (MAA) and 2-ethylhexyl acrylate (EHA). The terpolymer requires the use of ethanol for maintaining the polymers and monomers in solution. The use of ethanol in a polymer solution is generally undesirable because ethanol is expensive, creates a fire hazard and presents a waste disposal problem. Further, the use of EHA in aqueous systems is also undesirable. EHA interferes with the aqueous system, thereby making it difficult to reach solubility at a pH below 7.

Thus, it would be preferable to formulate a hydrogel polymer that is soluble in an aqueous solution for use in coating latex articles and for other applications. It would also be preferable to formulate a hydrogel polymer that is safer, less expensive and more environmentally friendly.

While the formulation is crucial to the quality and characteristics of a hydrogel polymer coating, the method of applying the polymer to the natural rubber or latex substrate is also important. In prior art methods for the application of a polymeric coating to the surface of a rubber or latex article, the latex or rubber is generally heat dried prior to applying the coating. Additionally, the prior art generally requires an acid priming step to prepare the rubber or latex article for receiving a hydrogel polymer coating. The acid priming step generally involves immersing the rubber or latex article in an acid solution. Following immersion, the article is rinsed to remove any residual acid. Use of an acid priming step in a coating operation has proven to be undesirable because it is an additional step that is time consuming and expensive. Moreover, the acid presents a waste disposal problem and requires that the article to be treated undergo an additional rinse step.

U.S. Pat. No. 4,575,476 ('476 patent) discloses a latex surgical glove having bonded to its inner surface a layer of hydrogel polymer consisting of a copolymer of HEMA with MAA or in the alternative a terpolymer of HEMA, MAA and EHA. In fabricating the surgical glove, hand-shaped mandrels are dipped into rubber or latex to produce a thin rubber coating on each mandrel. The coated mandrels are then leached in hot water and the hand-shaped mandrels are primed for coating by dipping the mandrels in dilute sulfuric acid and rinsed to remove the sulfuric acid. The rubber, still on the mandrels, is then dipped into a 4% ethanol solution of a HEMA/MAA/EHA terpolymer, having a monomer ratio of 5:1:2, plus cross-linking agents and curing catalysts. The rubber is then vulcanized and the polymer simultaneously cured.

The '844 patent teaches an acid priming technique similar to the one disclosed in the '476 patent. In the '844 patent, each glove former or mandrel is first dipped in a coagulation solution such as calcium salt and dried. The glove mandrel is then dipped in a conventional solution of latex rubber and heated to dry the latex rubber. The coated mandrel is then dipped in a leach tank of water (70° C.) for several minutes and thereafter immersed in a solution of dilute sulfuric acid and rinsed.

Consequently, there exists a need for a water soluble hydrophilic polymer coating that is also alcohol-free thereby avoiding the problems associated with polymer coatings that employ an organic solvent such as ethanol. The polymer coating should be applicable to the surface of a rubber or latex article in a single step that does not require an acid priming and rinse step prior to application of the coating to the rubber or latex articles.

All patents and references referred to throughout this specification are hereby incorporated by reference.

SUMMARY OF THE INVENTION

This invention relates to a water soluble hydrophilic hydrogel polymer coating in an alcohol-free aqueous solution and also to a method for applying such material to a natural rubber or synthetic latex article in a single application step without the use of an acid primer. The invention also relates to a natural rubber or synthetic latex surgical glove coated with the hydrophilic polymer of the present invention.

The polymer coating of the present invention is prepared from the monomers 2-hydroxyethyl acrylate (HEA), 2-hydroxyethyl methacrylate (HEMA) and methacrylic acid (MAA) and generally comprises 45–85 mol % of HEA; 15–55 mol % of HEMA; and 0–15 mol % MAA. The preferred polymer coating comprises 70–85 mol % HEA, 15–25 mol % HEMA and 0–5 mol % MAA. An especially preferred embodiment comprises 78.15% HEA and 21.85 mol % HEMA. The polymer coating of the present invention can be applied to the surface of a natural rubber or synthetic latex surface and is hydrophilic, i.e., absorbs water.

The HEA-HEMA polymer of the present invention forms a continuous smooth film on the surface of a natural rubber or synthetic latex substrate. The fact that the polymer coating forms a smooth and continuous film greatly facilitates the coating process and provides a uniform and superior coating on the rubber article.

The polymer is prepared by addition polymerization in aqueous solution of up to about 35% monomer concentration, although higher concentrations of co-monomers are feasible. Following polymerization the aqueous solution is adjusted to a pH of 4.0 or greater. More preferably, the aqueous solution is maintained at a pH above 4.0 throughout polymerization. The aqueous solution is alcohol-free and avoids the undesirable problems associated with alcohol such as high cost, fire hazards and waste disposal.

The method of the invention for applying the polymer coating to natural rubber or synthetic latex articles is superior to prior art application methods in that the polymer coating can be applied while the natural rubber or synthetic latex coating is still wet. Although, some degree of drying is necessary prior to coating, there is no need to fully dry or vulcanize the natural rubber or synthetic latex article prior to coating with the hydrophilic hydrogel polymer solution. No acid priming step is required prior to coating the latex substrate with the polymer of the invention. Omitting these steps saves substantial time and expense in the overall coating process. Thus, the polymer of the present invention can be applied in a single alcohol-free step resulting in a coating process that is faster, vastly more efficient and therefore less expensive than prior art methods.

These, as well as other features of the invention, will become apparent from the detailed description which follows, considered with the appended drawings.

BRIEF DESCRIPTION OF THE DRAWINGS

The objects and features of the invention may be understood with reference to the following detailed description of an illustrative embodiment of the invention taken together with the accompanying drawing.

DETAILED DESCRIPTION OF THE INVENTION

Figure 1:
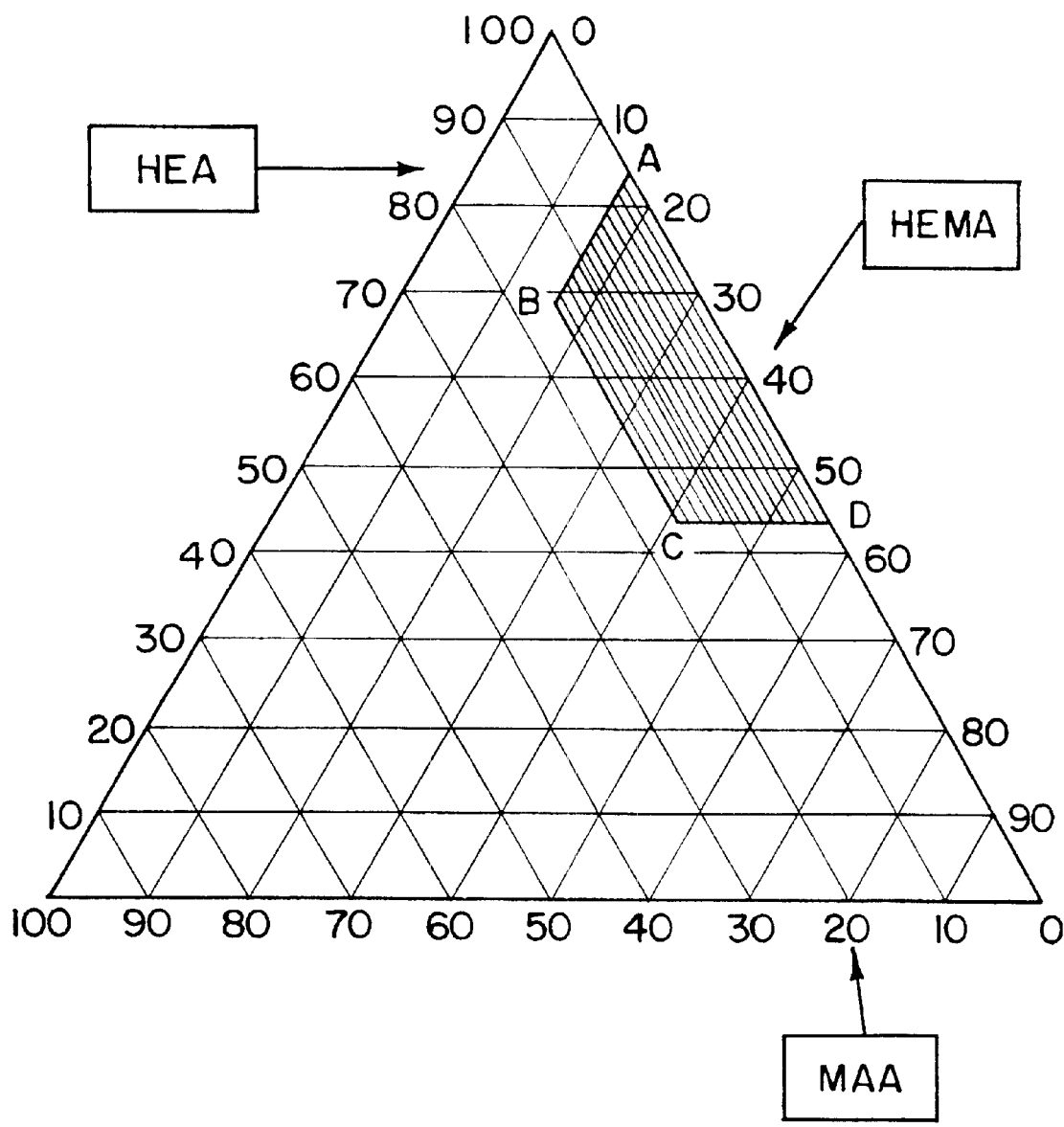
FIG. 1 is a ternary composition diagram disclosing the monomer ratio regions of the polymer composition of the present invention.

The hydrophilic resin of this invention is preferably a polymer of hydroxyethyl acrylate (HEA) with 2-hydroxyethyl methacrylate (HEMA) and methacrylic acid (MAA). In general, the polymer comprises approximately 45–85 mol % HEA, 15–55 mol % HEMA, and 0–15 mol % MAA. The polymer composition preferably comprises 70–85 mol % HEA, 15–25 mol % HEMA, and 0–5 mol % MAA. In forming the HEA-HEMA polymer, polymerizable strong acids or their salts, other than MAA, may also be utilized. For example, MAA may be replaced by strong-acid monomers, such as: methallyl sulfonic acid, p-styrene sulfonic acid, vinyl phosphonic acid, vinyl benzyl sulfonic acid, vinyl sulfonic acid, 2-sulfoethyl methacrylate, 3-sulfopropyl methacrylate or the like or their salts. Also, related monomers such as 2-hydroxypropyl acrylate, 2-hydroxypropyl methacrylate, 2-hydroxyethyl methacrylamide and 2-hydroxypropyl methacrylamide can be substituted for HEA and HEMA in addition to minor amounts of other monomers which do not impair the properties of the polymer.

To initiate polymerization, azo compounds, persulfate salts and redox techniques may be utilized. One especially preferred initiator is 2,2'-azo-bis[2-methyl-N-(2-hydroxyethyl) propionamide].

To preserve the water soluble characteristic of the polymer, it is important to use the proper ratio of HEA to HEMA (i.e. a ratio that will ensure that the polymer remains in solution). It has been found necessary to formulate the polymer using 45 to 85 mol % HEA in order to maintain polymer solubility in an aqueous solution. It was once thought that desirable solubility could not be achieved below 65 mol % HEA.

Surprisingly, it has now been discovered that solubility can be achieved at about 45 mol %. Although the maximum amount of MAA usable for formulating the polymer has not been determined, it has been found that polymers formulated without any MAA still form satisfactory coatings.

Stability of the polymer solution is adversely affected by low pH, e.g., pH=2–3. At these low pH levels the polymer solution tends to gel, apparently by an acid-catalyzed transesterification reaction. This effect is not seen if the pH is maintained at approximately 4.0 or above. Therefore, following the polymerization reaction, the pH of the aqueous solution should be adjusted to 4.0 or greater. A preferred method for avoiding the deleterious gelling of the polymer caused by low pH is to ensure that during the polymerization process, the pH is not permitted to fall below approximately 4.0 at any time. Maintenance at approximately pH 4.0 or above allows for 35–40% solids concentrations during the polymerization process. Maintenance of the pH at approximately 4.0 or greater is achieved by use of an initiator system wherein for each mol of sodium persulfate used, at least 2 mols of sodium hydroxide, or of a similar base, are used. In this manner, when the persulfate decomposes in the reaction, the immediate product, sodium bisulfate is neutralized by the sodium hydroxide. The viscosity of the resulting polymer and its molecular weight is affected by the quantity of persulfate initiator added in conjunction with the monomer.

It has also been found that the presence of excess persulfate after polymerization has been completed can adversely affect the color of the polymer solution. Thus, in the case when persulfate is used in the reaction, and in order to accomplish complete polymerization without affecting polymer color, and possibly properties, it has been found best to terminate persulfate addition at the end of the monomer addition, and to add an amount of a water-soluble azo-type initiator, such as 2,2'-azobis[2-methyl-N-(2-hydroxyethyl) propionamide], e.g. WAKO VA-086.

It has additionally been found by using lesser amounts of initiator that the molecular weight of the polymer product is increased, resulting in a higher solution viscosity.

Table 1 below lists several different HEA-HEMA polymer formulations and their solubility characteristics.

TABLE 1

HEA-HEMA-MAA Polymers

| Example No. | HEA | Mol % HEMA | MAA | Polymer Properties | Coating Result |
|---|---|---|---|---|---|
| L-83 | 78.1 | 21.9 | | 36.4% solids/pH 4.3 | Good |
| L-108 | 50.0 | 50.0 | | 21.6% solids/pH 4.8 | Good |
| L-110 | 45.0 | 55.0 | | 21.6% solids/pH 5.0 | Good |
| L-130 | 46.0 | 52.0 | 2.0 | 23.1% solids/pH 4.45 | Good |

Once formulated, the polymer or resin is diluted in water to form a coating solution containing 3–7 weight % polymer. The coating solution is maintained at a pH of approximately 1–4.5. The coating solution should be formulated to contain urea-formaldehyde, melamine-formaldehyde or glyco-uril cross-linking agents at 15–40 phr (parts per hundred parts of polymer resin). The cross-linking agents insolubilize the polymer enabling it to form a stable film which greatly facilitates the coating process. In addition to the cross-linking agents, water soluble sulfonic acid at 1-2 parts per hundred (by weight) of the polymer or other acidic catalyst is added and a high molecular weight polyacrylic acid such as ACUMER 153 (Rohm & Haas Co., Philadelphia, Pa.) or ACRYSOL ASE-95 (Rohm & Haas Co.) is added at a ratio of 5–15 parts (by weight) per hundred parts of polymer-water mixture. It has now been found that application of this resin system in the absence of the polyacrylic acid results in a thinner coating that does not form an even film. The disclosed hydrophilic HEA/HEMA/MAA polymer resins of the present invention have a composition within the bounds of the area ABCD in the ternary composition diagram of FIG. 1. The area ABCD is believed to cover substantially all of the possible polymer formulations of the present invention.

Once the polymer coating is properly formulated, the coating can be applied to a wet natural rubber or synthetic latex gel or to a dried rubber or latex film by simply dipping the article into the polymer coating. Coatings have also been applied on flat films by brushing or rolling the coating mixture onto the film. Dry vulcanized rubber films, devoid of any silicone or other surface treatments, have been coated by immersing the film in coating solution and curing. Examples of synthetic elastomers coated using this process include polyurethane latex films, nitrile rubber latex films and neoprene rubber latex films. After the substrate is coated, curing and insolubilization of the resin is accomplished in conjunction with vulcanization of the rubber by heating the resin for up to twenty minutes at temperatures of between about 100 and 140° C.

The method of coating latex articles with the hydrogel polymers of the present invention includes the steps of:

(a) forming a rubber or synthetic latex article by dipping a mandrel or substrate, with or without a coating of coagulant, in a rubber or latex solution;

(b) dipping the article, or former, after the rubber or latex coating has been allowed to dry sufficiently to have a "set" or non-flowing character in a solution of hydrophilic hydrogel polymer coating prepared according to the present invention;

(c) vulcanizing said rubber and simultaneously curing the resin by application of heat; and, (d) stripping the resulting article from the mandrel.

An important feature of the present invention is that application of the hydrogel polymer coating to the rubber article and the vulcanization and curing of the coated article can be carried out in a single continuous step without the need for a separate acid priming step.

For purposes of illustration only, the method of coating will be described in reference to a surgeon's glove. However, the disclosed method can be used to make other skin or tissue-contacting flexible rubber articles such as condoms, catheters, ureters and sheath-type incontinence devices, as well as articles described in U.S. Pat. Nos. 5,419,913 and 5,620,702.

Surgical gloves are customarily fabricated by dipping processes well known in the art. In normal fabrication, a surgical glove is formed by dipping a former or substrate such as a porcelain mandrel (having the shape of a human hand) into a rubber or latex solution. During fabrication, the glove surfaces are reversed on the mandrel from their positions when normally worn on the hand of a wearer. That is, the external surface of the glove (i.e. the one not in contact with the mandrel) is actually the internal surface of the glove when it is worn by the user. Thus, the polymer coating of the present invention is in contact with the skin of the glove wearer and provides enhanced lubricity, improved donning qualities and wearing comfort.

Prior to dipping the former or substrate in rubber or latex solution, the mandrel is first immersed in a coagulant solution and dried. After drying, the mandrel is dipped into a tank containing the liquid rubber or latex. The rubber-coated mandrel is heated to partially vulcanize and "set" the rubber film, wherein the outer glove surface is adjacent to the surface of the mandrel. The rubber-coated mandrel is then immersed in a water bath to dissolve out (leach) and wash away the coagulant salts and then heated to partially vulcanize the rubber. After the leach step, the rubber-coated mandrel is then dipped into one or more strong acids to prime the outer surface of the rubber article for coating. This is followed by washing the glove several times with aqueous rinsings or neutralizing solutions to remove any residual acid. Suitable rinsing is accomplished in water, however, neutralizing solutions may be used with the invention, including dilute aqueous solutions of ammonia or sodium bicarbonate.

In practicing the method of the present invention, many of the steps called for by the prior art are not required, thereby enabling a significant savings in time and expense. For example, there is no need for alcohol and no acid priming and rinse steps required to prepare the rubber or latex article for coating.

In the method of the present invention, after the mandrel has been coated, it can be immersed in a polymer solution which is prepared as outlined below in Example 3. While the mandrel cannot be coated while fully wet, i.e., immediately after a straight-dip (no coagulant) or coagulantdip procedure, the mandrel can be immersed in the polymer solution while still in a wet-gel form, that is, partially dried and no longer capable of flow to obtain a polymer coating. There needs to be some consolidation of the latex or rubber, that is, some degree of drying prior to immersion in the polymer solution. The rubber or latex should be set in a "wet gel" state prior to coating, so that it will not fall or drip off the mandrel under the force of gravity.

EXAMPLE 1

A hydrophilic resin is prepared by adding the following compounds to a reaction flask equipped with an agitator, reflux condenser, two input ports, and 400 g of water heated to reflux:

1. 2-Hydroxyethyl Acrylate (HEA) 240.68 9; and
2. 2-Hydroxyethyl Methacrylate (HEMA) 75.35 g.

Initiator mixture is prepared in a separate vessel as follows:

1. 10.4 g sodium persulfate;
2. 4.4 g sodium hydroxide; and
3. 180 g water.

The monomer mixture and the initiator mixture are added simultaneously over a period of 45 minutes via separate metering pumps and inlet ports to the refluxing and agitating reactor. Following completion of monomer addition, and termination of initiator addition (if any is still left to be added), a solution of 0.32 g of WAKO VA-086 azo initiator in 10 g of water is added. This may be added rapidly.

Continue to reflux for 60 minutes following completion of monomer addition. Cool to room temperature, with addition of: 3.1 g Methylparaben; or a similar-acting biocide and a 5% sodium hydroxide solution as required to adjust to pH 4.0–4.5.

The produced polymer solution possessed the following properties:

Color: Clear—light yellow.
Solids: 35.5% yield
pH: 4.3 (without the need for addition of sodium hydroxide following polymerization)
Viscosity: 254 cps

EXAMPLE 2

A hydrophilic resin is prepared by first adding 250 ml of water to a reaction flask equipped with an agitator, reflux condenser, proportioning pumps, heated to reflux with agitation.

A monomer mixture was prepared as follows:

1. 2-Hydroxyethyl Acrylate (HEA) 53.8 g;
2. 2-Hydroxyethyl Methacrylate (HEMA) 68.1 g;
3. Methacrylic Acid (MAA) 1.7 g; and
4. water 50.0 g.

An initiator mixture was prepared in a separate vessel as follows:

1. Sodium Persulfate 9.81 g;
2. Sodium Carbonate 5.33 g; and
3. Water 120 g.

The monomer mix and initiator mix were added simultaneously over a period of 35 minutes via separate metering pumps and inlet ports to the refluxing and agitating reactor. Following completion of monomer addition, and termination of initiator addition (if any was still left to be added), a solution of 1.0 g WAKO VA-086 azo initiator in 20 ml of water was added.

The system was maintained at ref lux for an additional 60 minutes. The system was allowed to cool to room temperature with the addition of 0.5 g Merguard 1200, or similar biocide.

The produced polymer solution possessed the following properties:

Color: Pale yellow.
Solids: 23.1%.
pH: 4.45.
viscosity: 110 cps.

EXAMPLE 3

Coatings of these polymers have been applied to films of natural rubber and synthetic lattices using the formulations below:

Polymer: aqueous solution of 5% solids content;
CYMEL 373 Melamine formaldehyde resin: 15 phr, polymer basis;
ACRYSOL ASE-95 polyacrylic acid: 10 phr, polymer basis; and
p-Toluene sulfonic Acid: 1.5 phr, polymer basis.

When applying the polymer solution to natural rubber, the polymer was prepared as described above but diluted with water to between about 3 to 7 wt.% polymer, at a pH of between about 1.0–4.5. Thereafter, urea- or melamine formaldehyde or glyco-uril cross-linking agent were added at 15–40 phr, water soluble sulfonic acid at 1–2 phr and high molecular weight polyacrylic acid at 5–15 phr. The resulting coatings were cured for 15 minutes at 130° C. Low levels (1.5–4 phr) of CYCAT 4040 should be added to speed the curing process and ASE-95, a polyacrylic acid preparation, is used to provide good coverage and flow properties.

After the hydrophilic polymer is properly formulated by addition of cross-linking agents and catalysts, the rubber-coated mandrel can be dipped into the coating mixture as required to provide a uniform resin coating on the glove. The coated rubber glove is then heat dried and vulcanized between 5 and 20 minutes at 100–130° C. which simultaneously cures the resin and bonds it to the rubber. After the vulcanization and curing step, the glove is stripped from the mandrel.

TABLE 2

COATING HARDNESS COMPARISONS
(Durometer Hardness of Cured Films on Glass at Various R.H.
Wherein Each Value is the Average of Six Samples Each of A, B and C)

|    | 20% R.H. | 50% R.H. | 75% R.H. |
| --- | --- | --- | --- |
| A: | 97.0 | 98.17 | 97.67 |
| B: | 98.0 | 98.0 | 98.0 |
| C: | 97.17 | 98.83 | 98.0 |

Coatings:
A: Ethanolic polymer of U.S. Pat. No. 4,575,476.
B: Aqueous polymer L-83.
C: Aqueous polymer L-130.

An important qualitative property of resinous films is the hardness of the cured film. The hardness of the film, as measured by a durometer is directly related to the ease with which the latex article can be donned. Further, the greater the hardness of the film, the more resistant to tearing of the final end product (e.g., a surgical glove) will be during donning. As seen in Table 2, above, the durometer readings of the aqueous systems of this invention, Samples B and C, are the same or even greater than those. of either the ethanolic systems Sample A. Thus, it is shown that the cured hydrophilic resin films of the instant invention provide identical or superior hardness, but in a less-expensive, safer and more environmentally friendly manner.

Although surgical gloves were used to illustrate the method of coating the hydrophilic polymer of the invention, the polymer coatings can be used on various natural rubber substrates such as wet gel films of natural and synthetic rubber.

The method of the present invention utilizes an aqueous system to formulate a hydrophilic resin without the use of alcohol or acid primers. This method provides a more efficient, inexpensive and safer process for making hydrophilic hydrogel resins.

What is claimed is:

1. A method for coating at least one surface of a rubber or latex article which comprises:

immersing the article in an aqueous solution of a hydrophilic resin comprising 45–85 mol % 2-hydroxyethyl acrylate, 15–55 mol % 2-hydroxyethyl methacrylate (HEMA), and 0–15 mol % polymerizable monomer;

removing the article from the hydrophilic resin; and heating the coated article, thereby simultaneously curing the resin and vulcanizing the rubber or latex.

2. The method of claim 1 wherein said hydrophilic resin comprises 2-hydroxyethyl acrylate (HEA), 2-hydroxyethyl methacrylate (HEMA) and optionally methacrylic acid (MAA).

3. The method of claim 2 wherein said hydrophilic resin comprises 70–85 mol % HEA, 15–25 mol % HEMA and 0–5 mol % MAA.

4. The method of claim 1 wherein said hydrophilic resin comprises 45–85 mol % HEA, 15–55 mol % HEMA and 0–15 mol % MAA.

5. The method of claim 4 wherein said hydrophilic resin comprises 78.15 mol % HEA and 21.85 mol % HEMA.

6. The method of claim 1 wherein said coated article is heated at the temperature between about 90 and about 140° C. for between about 5 and about 20 minutes.

7. The method of claim 1 wherein said rubber article comprises natural rubber, said resin is diluted to between 3 and 7% by weight of resin to water and includes a sulfonic acid, a high molecular weight polyacrylic acid and a member of the group consisting of; urea-formaldehyde; melamine-formaldehyde; or glyco-uril agent.

8. The method of claim 1 wherein said aqueous solution includes polyacrylic acid, a curing agent and a curing catalyst.

9. The method of claim 1 wherein said aqueous solution comprises up to 3–7% by weight of said resin and is maintained at a pH of 1–4.5.

10. The method of claim 1 wherein said rubber article is natural rubber in a wet gel state.

11. The method of claim 1 wherein said rubber article is a dried film.

12. The method of claim 11 wherein said dried film is formed from a synthetic latex.

* * * * *